United States Patent Office 3,113,152
Patented Dec. 3, 1963

3,113,152
PREPARATION OF METHYLHYDRAZINE
David Horvitz, Cincinnati, Ohio, assignor, by mesne assignments, to FMC Corporation, New York, N.Y., a corporation of Delaware
No Drawing. Filed Jan. 5, 1959, Ser. No. 784,899
4 Claims. (Cl. 260—583)

This invention relates to a novel process for the preparation of methylhydrazine. More particularly, the invention pertains to a method wherein methylhydrazine is obtained by the catalytic hydrogenation of N-nitromethylamine.

Methylhydrazine is an important rocket propellant because of its high performance characteristics. It can be used either alone as a monopropellant or in combination with oxidizers commonly employed in rocket propulsion. The compound has the further advantage of being hypergolic with nitric acid and other similar oxidizing agents. It is also useful as a pharmaceutical imtermediate, a photographic developer, and a chemical reducing agent.

A number of processes have been proposed in the prior art for the production of methylhydrazine. One such method condenses hydrazine with benzaldehyde, and the resulting benzalazine treated with dimethyl sulfate to form a complex, which on treatment with water in an acid solution gives methylhydrazine. Another method involves reacting N-methylurea with nitrous acid to produce the relatively unstable intermediate N-nitroso-N-methylurea, which is reduced with zinc dust and acid to yield methylhydrazine. One important disadvantage associated with these prior art processes is the requirement for the formation of intermediates which are complex or expensive.

One object of this invention is to provide a process for the preparation of methylhydrazine which avoids the difficulties encountered in the prior art processes. Another object of the invention is to provide a catalytic process for the preparation of methylhydrazine from N-nitromethylamine. A further object is to provide a process for the production of methylhydrazine which is readily adaptable to commercial operations. Other objects of the invention will become apparent from the ensuing description.

In accordance with the present invention, it has now been found that these objects are accomplished by reacting nitromethylamine with hydrogen in the presence of a palladium catalyst. The use of this particular catalyst is an important feature of the invention, since it was found that conventional hydrogenation catalysts were either ineffective or had such activity as to reduce the yield of methylhydrazine below economic levels. The palladium is preferably in finely divided form and may be used as such or supported on such conventional carriers as carbon, charcoal, barium sulfate, alumina, silica gel and the like. The amount of catalyst employed may vary over a wide range, though, in general, about 0.005 to 1.0 weight percent of palladium will be employed based on the weight of the nitromethylamine to be reduced.

Another important operating condition in the process of this invention is the use of a reaction medium having a pH within the range of about 1 to 7, preferably about 4 to 7. As hereinafter shown, the use of reaction media in which such pH values may be maintained can give good yields of the methylhydrazine. It has been found that such substances as water, weak acids, alcohols, etc. and mixtures thereof can be advantageously utilized for this purpose. Aliphatic alcohols, i.e. alkanols, containing from about 1 to 10 carbons, may be used. Illustrative alcohols include methanol, ethanol, propanol, butanol, hexanol, etc. Suitable aliphatic organic acids, i.e. alkaneoic acids, comprise monocarboxylic acids such as acetic acid, propionic acid, butyric acid and the like containing from about 1 to 10 carbon atoms per molecule. They may be used as additives or as solvents. Certain dicarboxylic organic acids, i.e. alkanedioic acids, such as oxalic acid, succinic acid, adipic acid and the like, having from about 2 to 10 carbon atoms per molecule can also be employed as additives. The use of a weak acid, and particularly acetic acid, is, however, preferred in the process of this invention.

Other operating conditions employed in carrying out the process include a pressure of about 25 to 3000 p.s.i., preferably about 200 to 1000 p.s.i., and a temperature of less than about 100° C., and preferably within the range of about 10° to 80° C.

In general, the process can be carried out by admixing the N-nitromethylamine and the reaction medium or solvent with finely divided palladium catalyst particles. The resulting mixture is then placed in a suitable reaction vessel and reacted with hydrogen under the operating conditions set forth above. It will be understood that a continuous process is also considered to be within the scope of the invention. Thus, the N-nitromethylamine and the reaction medium, either in admixture or separate streams thereof, may be fed directly into a reaction zone containing the palladium catalyst with subsequent removal of the reaction product mixture and separation therefrom of the methylhydrazine.

The methods employed for separating the methylhydrazine from the reaction product mixture are not deemed to be an inventive feature of the present invention. The methylhydrazine can be recovered, for example, as the sulfate, hydrochloride, oxalate, etc. by adding the appropriate acid, evaporating the solution and crystallizing the resulting salt. The reaction product mixture may also be made alkaline, and the free methylhydrazine base distilled as an aqueous solution.

The invention will be more fully understood by reference to the following illustrative example showing numerous runs wherein the criticality of the operating conditions described above is demonstrated.

EXAMPLE

A mixture of 0.74 gram of N-nitromethylamine, 10 mgs. of 5% palladium-on-charcoal catalyst and the solvent shown in the table below was agitated in a stainless steel vessel under 300 p.s.i. of hydrogen pressure, unless otherwise indicated, at the temperatures and for the time periods given below:

Table

| Runs | Solvent | Temp., °C. | Press., p.s.i. | Time, min. | Yield of Methylhydrazine, percent |
|---|---|---|---|---|---|
| 1 | 10 mls. H₂O | 5 | 300 | 210 | 12.2 |
| 2 | 10 mls. H₂O | 25 | 300 | 83 | 13.9 |
| 3 | 10 mls. H₂O, 0.74 gms. NaOH | 25 | 300 | 60 | 4.3 |
| 4 | 10 mls. Buffer Soln.[1] | 37 | 300 | 352 | 14.4 |
| 5 | 10 mls. Buffer Soln.[1] | 25 | 1,000 | 135 | 12.8 |
| 6 | 10 mls. H₂O | 55 | 300 | 170 | 14.2 |
| 7 | 10 mls. H₂O, 0.74 gms. acetic acid | 25 | 300 | 360 | 25.8 |
| 8 | 10 mls. H₂O, 1.48 gms. acetic acid | 25 | 300 | 360 | 25.8 |
| 9 | 10 mls. glacial acetic acid | 25 | 300 | 360 | 17.2 |
| 10 | 10 mls. methanol | 25 | 300 | 190 | 9.7 |
| 11 | Same as Run 7 | 83 | 300 | 120 | 7.0 |
| 12 | 10 mls. H₂O+1 ml. conc. HCl | | | | none |
| 13 | 10 mls. H₂O+1 ml. conc. HnO₃ | | | | none |
| 14 | 10 mls. H₂O [2] | | | | none |
| 15 | 10 mls. H₂O [3] | | | | none |
| 16 | 10 mls. H₂O [4] | | | | 2.0 |
| 17 | 100 mls. H₂O contg. 0.1 M succinic acid [5] | 25 | 1,000 | 240 | 23.2 |
| 18 | Same as Run 17 | 25 | 300 | 450 | 18.8 |

[1] Buffer Soln.—47.70 mls. of 0.1 N NaOH and 100 mls. of 0.1 N potassium acid phthalate by-product up to 200 mls. volume by the addition of H₂O.
[2] Catalyst used was platinum instead of palladium.
[3] Catalyst used was Raney nickel instead of palladium.
[4] Catalyst used was cobalt instead of palladium.
[5] 7.6 grams of N-nitromethylamine and 100 mgs. of 5% palladium-on-charcoal catalyst used in Runs 17 and 18.

The above data show the importance of utilizing a palladium catalyst and a reaction medium having a pH greater than 1 but not exceeding 7 in the process of hydrogenating N-nitromethylamine to produce methylhydrazine. The data also demonstrate the importance of utilizing reaction temperatures below about 80° C. in order to achieve commercially attractive yields.

While particular embodiments of this invention are shown above, it will be understood that the invention is obviously subject to variance and modification without departing from its broader aspects.

What is claimed is:

1. A method for preparing methylhydrazine which comprises reacting N-nitromethylamine with hydrogen at a pressure of about 200 to 1000 p.s.i. and at a temperature of below about 80° C. in the presence of a palladium catalyst and a liquid reaction medium having a pH of about 4 to 6, said reaction medium being selected from the group consisting of water, alkanols having from 1 to 10 carbon atoms per molecule, alkaneoic acids having from 1 to 10 carbon atoms per molecule, alkanedioic acids having from 2 to 10 carbon atoms per molecule, and mixtures thereof, and recovering said methylhydrazine.

2. The method of claim 1 wherein said catalyst is palladium supported on charcoal.

3. The method of claim 1 wherein said reaction medium is a mixture of water and an alkaneoic acid.

4. The method of claim 3 wherein said alkaneoic acid is acetic acid.

References Cited in the file of this patent

UNITED STATES PATENTS 2,717,200    Hanford _____ Sept. 6, 1955

FOREIGN PATENTS 797,483    Great Britain _____ July 2, 1958

OTHER REFERENCES

Richter: "Organic Chemistry," vol. 1, page 202 (1944).

Paal et al.: British Chemical Abstracts (1930), vol. A, p. 336.

Degering: "Organic Nitrogen Compounds," University Lithoprinters (Ypsilanti, Michigan, 1950) (pages 302, 315, and 381 relied on).